United States Patent
Kojori et al.

(10) Patent No.: US 9,013,066 B2
(45) Date of Patent: Apr. 21, 2015

(54) HIGH VOLTAGE ELECTRIC ACCUMULATORS WITH INTERNAL DISTRIBUTED DC-DC CONVERTERS FOR SELF REGULATION AND PROTECTION

(75) Inventors: Hassan Ali Kojori, Mississauga (CA); Harmohan N. Singh, Rockaway Township, NJ (US); David Lazarovich, Thornhill (CA); Momcilo Tanic, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 1211 days.

(21) Appl. No.: 12/914,502

(22) Filed: Oct. 28, 2010

(65) Prior Publication Data
US 2012/0104861 A1    May 3, 2012

(51) Int. Cl.
*H01M 10/46* (2006.01)
*H02J 7/00* (2006.01)

(52) U.S. Cl.
CPC . *H01M 10/46* (2013.01); *H02J 7/00* (2013.01)

(58) Field of Classification Search
CPC ........................................................ H01M 10/46
USPC ........................................................... 307/82
See application file for complete search history.

(56) References Cited

U.S. PATENT DOCUMENTS

| | | | |
|---|---|---|---|
| 5,508,905 A * | 4/1996 | Reichard | 363/71 |
| 5,982,645 A * | 11/1999 | Levran et al. | 363/37 |
| 6,867,987 B2 * | 3/2005 | Cheng et al. | 363/43 |
| 6,985,799 B2 | 1/2006 | Zalesski et al. | |
| 7,579,842 B2 | 8/2009 | Hunter et al. | |
| 7,808,125 B1 * | 10/2010 | Sachdeva et al. | 307/82 |
| 2010/0133025 A1 | 6/2010 | Flett | |
| 2010/0133912 A1 | 6/2010 | King et al. | |
| 2010/0136379 A1 | 6/2010 | King et al. | |
| 2011/0140663 A1 * | 6/2011 | Tofigh et al. | 320/116 |
| 2012/0025618 A1 * | 2/2012 | Erickson et al. | 307/77 |

* cited by examiner

*Primary Examiner* — Daniel Cavallari
(74) *Attorney, Agent, or Firm* — Shimokaji IP

(57) ABSTRACT

A power management system may employ a power source, a distribution system between the power source and electrical loads and an energy accumulator. The accumulator may comprise a plurality of energy processing blocks. Each block may have a limited number of energy storage cells connected in series to produce first voltage. A second higher output voltage from the accumulator may be achieved though integrated DC-DC, DC-AC and AC-DC conversion with intermediate boost of AC voltage through high frequency transformers. Bidirectional power flow may be achieved with high efficiency during charge and discharge of the accumulator. Secondary windings of the transformers may be connected with one another in series so that the accumulator can transfer energy between the distribution system and any one or all of the energy processing units in a fault-tolerant and efficient manner.

4 Claims, 4 Drawing Sheets

HIGH VOLTAGE ELECTRIC ACCUMULATORS WITH INTERNAL DISTRIBUTED DC-DC CONVERTERS FOR SELF REGULATION AND PROTECTION

BACKGROUND OF THE INVENTION

The present invention generally relates to electrical energy management systems. More particularly, the invention relates to energy accumulation systems for use in conjunction with generative power sources.

Due to developments in power electronics and an increase in the requirements for emergency and stored energy, higher voltages and power levels are required from batteries. Various electrical functions in aerospace and ground vehicles (tactical vehicles and automotive) may be performed with power systems which incorporate energy storage elements such as batteries, supercapacitors and/or fuel cells. These applications may include aircraft APU and main engine start and ground vehicle traction drives. Energy accumulators may be employed for effective harnessing or mitigation of bidirectional flow of electric energy and improving overall efficiency.

Some large scale energy storage systems may also be employed to satisfy mobile power and distributed renewable applications for peak power shaving and/or effectively using stored energy to avoid high cost of electricity during higher rates imposed by smart metering. In many of these applications, elementary battery cells may be connected in series so that an output terminal voltage equals a sum of elementary voltages.

In addition, many newer systems may employ lithium ion (Li-ion) batteries which consist of multiple cells in series. Increased output voltage may require an increased number of series connected cells. Conventional Li-ion systems require charge/discharge control and equalization at the cell level which may require considerable electronics, particularly in the case of higher voltage batteries.

It is known that for a particular power level, the current required from a higher voltage energy storage system is lower than that of a low voltage storage system. Thus high voltage systems provide improved efficiency and overall reduced weight, volume and cost. Traditionally, high voltage energy storage systems have been realized by a) connecting a large number of energy storage cells in series; or, b) using a low-voltage energy system and connecting it to an external DC-DC converter to boost the low-voltage voltage to the desired high voltage level. In the first instance, regulation, protection and overall reliability and availability of the energy storage system becomes a major issue and it becomes imperative to assure that degradation of any one cell (e.g. excessive capacity fading, voltage imbalance, open cell) does not lead to the failure of the entire energy storage system. In the second case the low voltage battery system requires additional external circuitry for its protection. Thus, overall energy storage system weight, volume and efficiency may be negatively impacted due to wide-variation of low-voltage range and various single point failures, both in the energy storage system and cascaded DC-DC conversion.

As can be seen, there is a need for self regulated and self protected high voltage energy storage system with integrated fault-tolerant power management system to reduce overall count of number of energy storage cells and to achieve high reliability and availability of power by eliminating single point failures

SUMMARY OF THE INVENTION

In one aspect of the present invention, a power management system may comprise: a power source; a distribution system between the power source and electrical loads; an energy accumulator comprising a plurality of energy processing blocks, the energy processing blocks individually comprising: an energy storage unit; a bidirectional DC-AC converters; and a primary windings of a transformer; and wherein secondary windings of the transformers are connected with one another in series so that the accumulator can transfer current to and from the distribution system through the transformers.

In another aspect of the present invention, an accumulator for electrical energy may comprise: a plurality of energy processing blocks comprising: energy storage units; bidirectional DC-AC converters; and transformers; wherein secondary windings of the transformers are connected with one another in series so that the accumulator can transfer current into and out of one or all of the energy storage units in a safe and fault-tolerant manner.

In still another aspect of the present invention, a method for managing power with an accumulator may comprise the steps of: producing a first quantity of direct current (DC) with a first energy storage unit; producing a second quantity of DC with a second energy storage unit; converting the first quantity of DC into a first quantity of alternating current (AC); converting the second quantity of DC to a second quantity of AC; supplying the first quantity of AC to a primary winding of a first transformer; supplying the second quantity of AC to a primary winding of a second transformer; and combining the first and second quantities of AC within series connected secondary windings of the first and second transformers.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a bidirectional power management system in which energy may be supplied to electrical loads, when the accumulator is being discharged; or supplied with energy from regenerative loads or other sources of energy during charging-mode. The accumulator may comprise a plurality of energy processing blocks internally connected together for realizing a high energy storage system. The energy processing blocks may deliver stored energy to the electric power system through dedicated converters so that high output voltages may be achieved with a relatively low number of energy storage cells.

Figure 1:
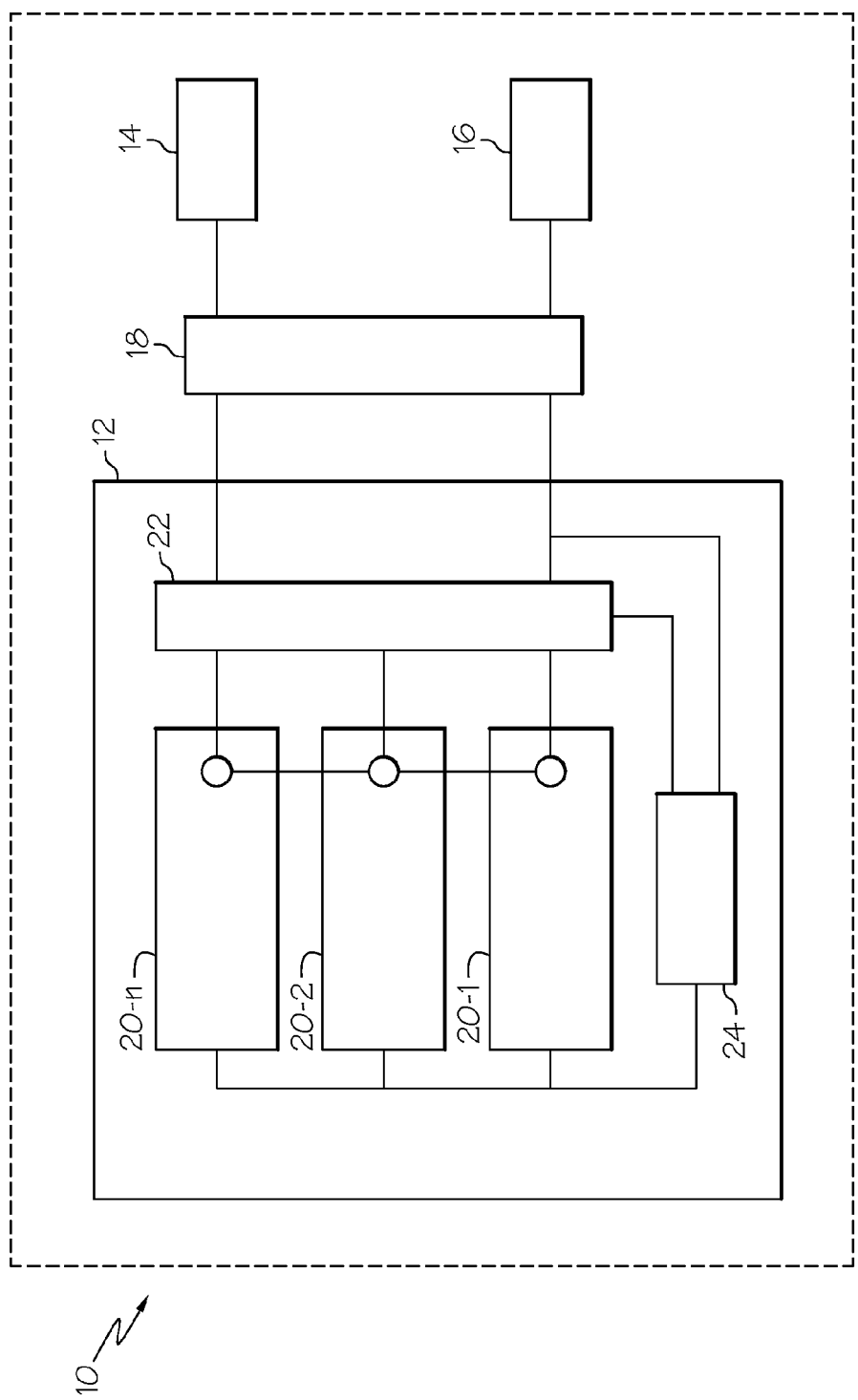
FIG. 1 is a block diagram of a power management system in accordance with an embodiment of the invention.

Referring now to FIG. 1, an exemplary embodiment of an electric power management system 10 is shown in block diagram form. The electric power management system 10 may be one example of a system that may employ a novel energy storage accumulator 12 connected to a high voltage DC bus (for example 270 VDC or ±270 VDC) of a more electric vehicle such as an aircraft or electric car. The system 10 may comprise various types of AC power sources such as a main engine generator or an auxiliary power unit (APU) generator which may be connected to high-voltage DC side of the accumulator 12 through AC-DC converters and together or individually may supply power to various types of AC and/or DC loads which in turn may require additional power conditioning from high voltage DC bus of the accumulator or other sources of power. As an exemplary application, for purpose of simplicity, FIG. 1 only shows a power management system which has a DC power source 14 and a DC electrical load 16 which may be connectable to the power source 14 and/or the accumulator 12 through a power distribution system 18. This concept could be easily expanded by those skilled in the art to include other types of electric power system architectures including various AC sources, AC loads and other required power electronics based bidirectional converters for transfer of energy between various AC and DC buses. Power from the DC source 14 may be transferred in a bidirectional manner directly to the electrical load 16 or to the accumulator 12. In the charge-mode, power may be supplied to the accumulator 12 and may be stored in the energy storage units of the accumulator 12. In the discharge-mode, stored energy may be subsequently used to supply energy to the electrical loads 16. In some circumstances, power may be provided from the DC source 14 or the accumulator 12 individually or in combination to meet a higher peak-power demand, as required. This may provide various beneficial opportunities for starter/generator applications and also energy and power optimization to meet short-term higher peak power demands resulting in reducing the overall weight, volume and cost of some of the main components of the electrical power system (e.g., generators and power converters) and may ultimately result in improving in fuel efficiency and lowering life-cycle cost.

The accumulator 12 may comprise a plurality of energy processing blocks 20-1, 20-2 through 20-n interconnected with a common AC-DC converter such as a synchronous rectifier 22. A controller 24 may control operation of the energy processing blocks 20-1 through 20-n.

Figure 2:
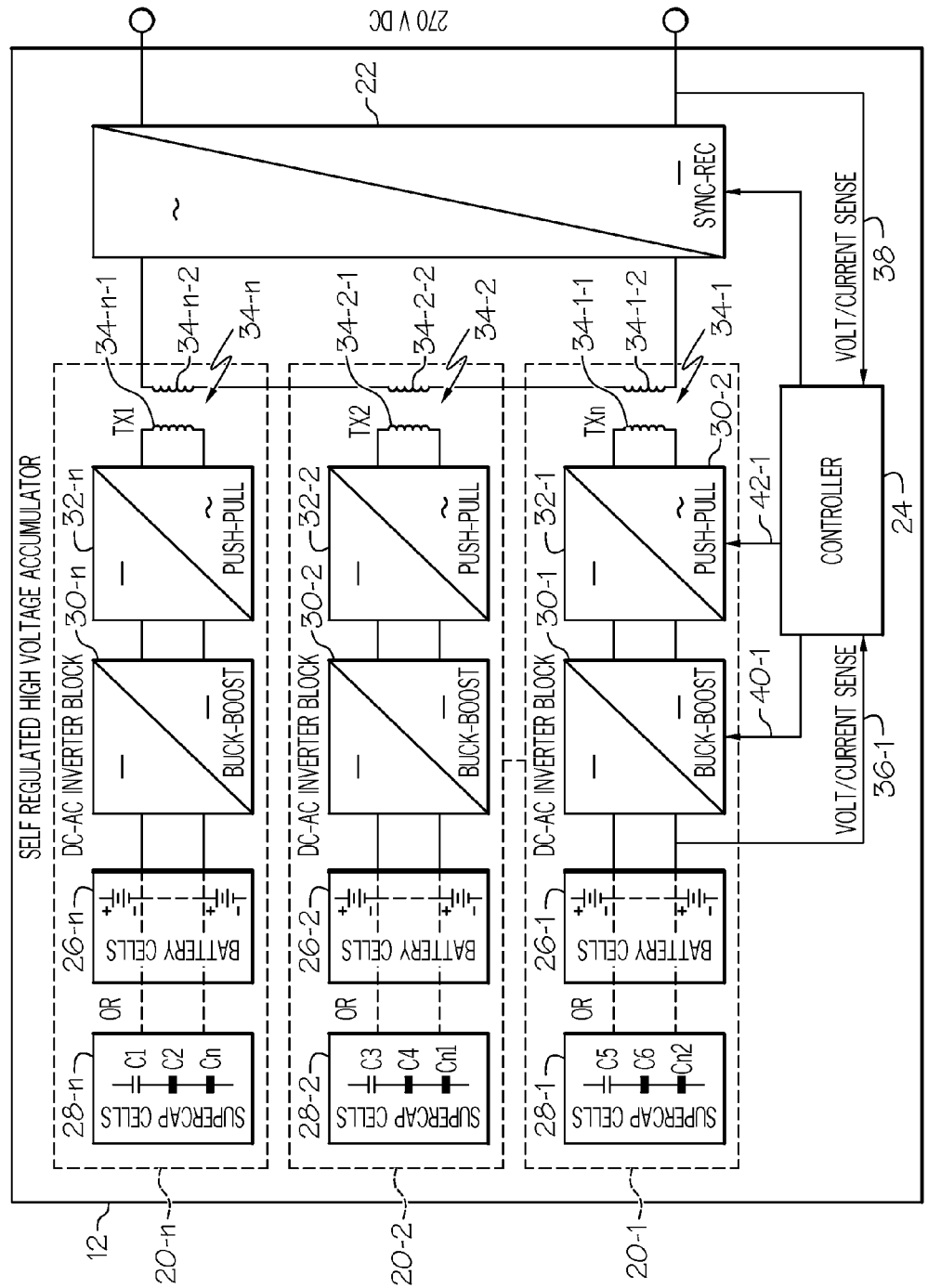
FIG. 2 is a block diagram of an energy accumulator in accordance with an embodiment of the invention.

Referring now to FIG. 2, the high voltage electric accumulator 12 is shown in block diagram form. For the sake of simplicity input and output filters are not shown. The low voltage side may be comprised of multiple energy processing blocks 20-1 to 20-n which may be configured for series connection to secondary transformer windings to obtain a high voltage AC output which may then go through a common synchronous rectifier 22 to provide high voltage DC output and bidirectional energy transfer. In FIG. 2, for purpose of simplicity, the controller 24 is shown interconnected only with the energy processing block 20-1. It is to be understood all of the blocks 20-1 through 20-n may be interconnected with the controller 24 for a centralized control architecture. Control function could also be achieved through distributed standalone controllers for each of the energy processing blocks 20-1 through 20-n in master-slave mode as known to those skilled in the art. For purposes of illustration, only centralized control is shown and interaction between the block 20-1 and the master controller 24 are described hereinbelow. The controller 24 may be responsive to one or more external control parameters such as terminal output voltage and current of the accumulator and one or more internal control parameters such as individual energy storage cell temperatures, voltages, currents and state-of-charge, and health status of functional power processing units.

The block 20-1 may comprise a battery unit 26-1 comprised of battery cells or it may comprise a supercapacitor unit 28-1 comprised of supercapacitor cells. The units 26-1 or 28-1 may be interconnected with a DC-DC converter 30-1. Advantageously, the converter 30-1 may be a bi-directional buck-boost converter which may provide an output of regulated DC voltage higher than the sum of voltages of individual cells in 26-1 or 28-1 to reduce the overall current in the next conversion stage 32-1 and hence improving efficiency. The converter 30-1 may be interconnected with a DC-AC converter 32-1. Advantageously, the converter 32-1 may be a bi-directional push-pull converter at 50% duty cycle which may provide an output of regulated AC voltage in one direction for discharging energy from energy storage units 26-1 and/or 28-1 to 26-n and/or 28-n of the accumulator 12; and regulated DC voltage in an opposite direction for charging the energy storage units by transferring energy from high-voltage side to low voltage side.

A transformer 34-1 may have its primary winding 34-1-1 connected to the DC-AC converter 32-1. Additionally, the secondary winding 34-1-2 may be connected in series with secondary windings 34-2-2 through 34-2-n of the blocks 20-2 through 20-n respectively. Alternatively, in another embodiment not shown here, each of the secondary windings 34-1-2 to 34-1-n may be connected to individual synchronous rectifiers, hence achieving rectification through multiple synchronous rectifiers working in parallel and one for each energy processing block. This approach may be beneficial for a) reducing filtering requirements by interleaved PWM patterns of the synchronous rectifiers and b) eliminating single point failure of a single output synchronous rectifier. Benefits may be weighed against increased parts-count, controls complexity and overall cost.

In operation, the blocks 20-1 through 20-n may be commanded to deliver a desired output voltage to the synchronous rectifier 22, in a fault-tolerant manner. For example, if all of the blocks 20-1 through 20-n were available, they could be commanded to provide equal output voltage, then each block would produce $V_{out}/n$; where $V_{out}$ is a desired output voltage of the accumulator 12 and n is a number of the functional blocks. On the other hand, if one of the blocks were to become non-functional, then one or more of the remaining functional blocks may be commanded to produce output voltage of $V_{out}/(n-1)$. Advantageously, the blocks 20-1 through 20-n may be floating with respect to each other so that any block may be allowed to alter or even cease its output without affecting the normal operation of the other blocks.

One may consider these operational features in the context of the block 20-1. The controller 24 may be provided with a measured volt/current signal 36-1 from the unit 26-1 or 28-1. Additionally, the controller may be provided with a measured volt/current signal 38 from the synchronous rectifier 22. The controller 24 may employ information from the signals 36-1 and 38 to provide a control signal 40-1 to the converter 30-1 to control output voltage and current from the block 20-1. Additionally or alternatively, the controller 24 may provide a control signal 40-2 to the converter 32-1 to control output voltage and current from the block 20-1. It may be seen that the accumulator 12 may, among other functions, provide voltage boost for energy storage units 26-1 through 26-n or 28-1 through 28-n. Thus, for example, in the exemplary case of the units 26-1 comprising a 7-cell Li-ion battery, the accumulator 12 may boost output of the unit 26-1 to about 270 volts, even though the output voltage of the batteries may be only about 28 volts. This may be the result of voltage increase provided by the converters 30-1 and/or 30-2 and/or a voltage increase from the transformer 34-1. Additionally, part of this voltage boost may advantageously develop because the transformer secondary windings 34-2-1 through 34-2-*n* may be connected together in series; therefore, voltage to the rectifier 22 may be equal to a sum of the voltages at each of the secondary windings. Thus the total number of energy storage battery and/or supercapacitor cells for a high voltage electric accumulator may be significantly reduced. For example, for a typical high voltage electric accumulator having 270 VDC output, the total number of energy storage cells in series may be reduced by an order of magnitude and multiple units of such energy storage units may be used independently from each other in parallel to meet the power and energy requirements expected from the electric accumulator 12. This may result in a self regulated and self protected electric accumulator which is fault tolerant. Additionally, the complexity of electronic components that are required for cell overcharge/overdischarge monitoring and equalization may be reduced resulting in reduced weight, volume and improved efficiency.

It should be noted that the blocks 20-2 through 20-*n* may be constructed with: energy storage units 26-2 through 26-*n* or 28-2 through 28-*n*; DC-DC converters 30-2 through 30-*n*; DC-AC-DC converter 32-2 through 32-*n* and transformers 34-2 through 34-*n* respectively.

It should also be noted that the accumulator 12 may, through use of the controller 24, retain full operability in the event of malfunction or deactivation of any one or more of the blocks 20-1 through 20-*n* by redistributing the overall energy flow through the energy processing blocks which may remain functional or activated. Also the controller 24 may incorporate embedded prognostics health management capabilities including but not limited to State of Charge calculation and various protection functions such as overvoltage, undervoltage, overcurrent, or over-temperature at input or output, as required.

The energy storage units 26-1 through 26-*n* and the energy storage units 28-1 through 28-*n* may be constructed with various exemplary configurations. The energy storage units 26-1 through 26-*n* may comprise one or more batteries such as lithium ion cells or lead-acid cells connected in series or in parallel. The energy storage units 28-1 through 28-*n* may comprise a collection of supercapacitors. Additionally, other types of electrical energy delivery systems such fuel cells may be used. It may be advantageous to construct the accumulator 12 with a combination of battery-based energy processing blocks and supercapacitor-based energy processing blocks. In such a configuration, supercapacitor-based energy processing blocks' may allow the accumulator 12 to effectively absorb regenerative power which may be rapidly delivered to the accumulator 12. Presence of battery and fuel-cell based energy processing blocks may allow the accumulator 12 to deliver power to the distribution system 18, of FIG. 1, over an extended period of time, whereas supercapacitor-based blocks may be useful for quick charge and discharge of much larger amounts of electrical energy over smaller periods of time.

In an exemplary series of operations, the accumulator 12 may be provided with a rapidly regenerated surge of power. The battery-based energy storage units 26-1 through 26-*n* may not be able to absorb the surge, but the supercapacitor-based energy storage units 28-1 through 28-*n* may effectively absorb and store the surge of regenerated power. In a later stage of operation, power may be drawn from the accumulator 12 over an extended period of time. The controller 24 may command that the supercapacitor-based energy storage units be discharged to meet the peak-power demand. Supercapacitors may be advantageously charged and discharged independently from batteries to higher and lower voltage levels and this may have the benefit of utilizing the maximum supercapacitor energy storage capacity. An energy demand period may extend beyond the discharge time of the supercapacitor-based energy storage units. In that event, the controller 24 may be provided with signals such as signals 36-1, advising that the supercapacitor-based energy storage units have exhausted their charge. The controller 24 may then mitigate charge and discharge and duty-cycle of operation of the supercapacitor energy storage units 28-1 through 28-*n* through the battery-based energy storage units 26-1 through 26-*n* so that energy may be supplied to cyclic loads with intermittent higher peak-power demands in an optimized manner.

Figure 3:
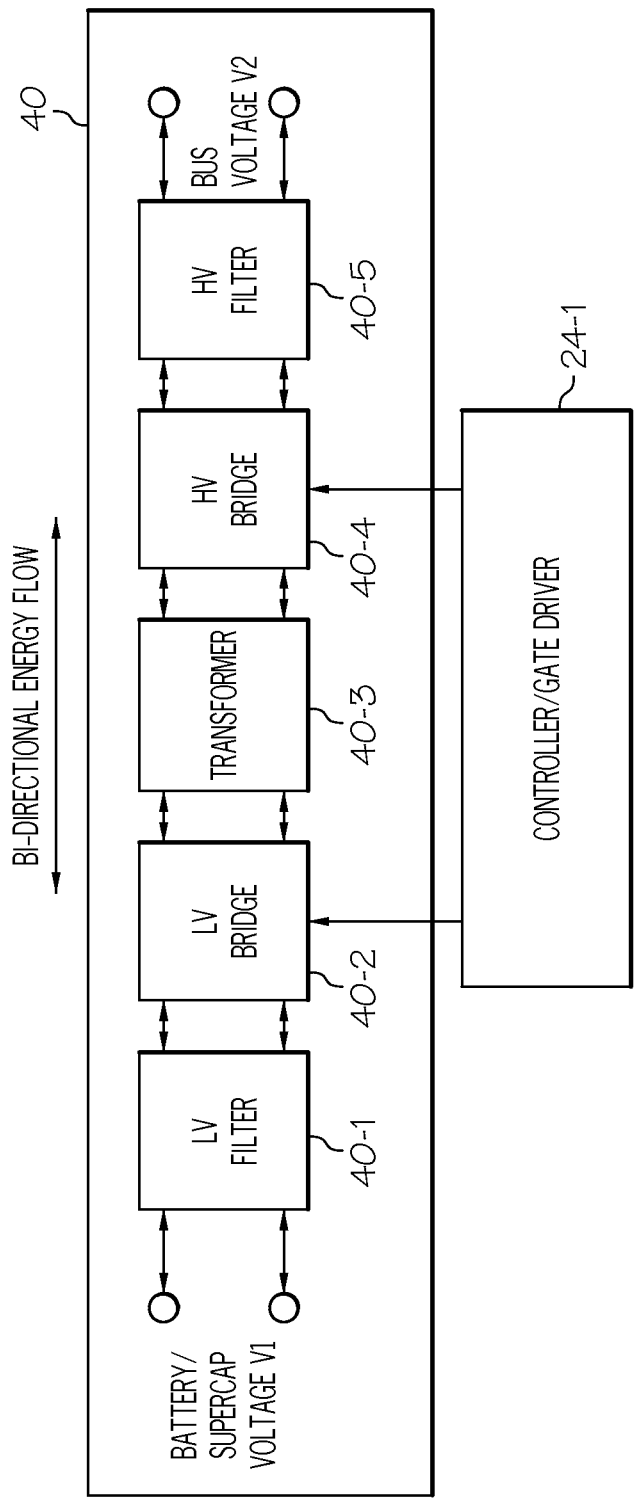
FIG. 3 is a block diagram of a DC-DC converter in accordance with an embodiment of the invention.

Referring now to FIG. 3, a detailed block diagram shows an alternate exemplary embodiment for an energy converter 40 which may be employed in one or more of the energy processing blocks 20-1 through 20-*n* for achieving the task of DC-AC-DC conversion with galvanic isolation. The converter 40 may comprise a low-voltage filter 40-1 to minimize harmonics fed to energy storage units, a low voltage DC-AC bridge 40-2 to boost the voltage and at the same time convert DC to AC voltage, a high-frequency planar magnetic transformer 40-3, a high-voltage AC-DC bridge 40-4 and a high voltage filter 40-5. The bridges 40-2 and 40-4 may receive PWM gating and control signals through a common controller/gate-driver unit 24-1. In this particular configuration the converter 40 may exhibit various desirable features such as bi-directional power flow and high efficiency. High efficiency may be provided through optimized power topology using only one stage of conversion to generate AC from DC voltage and utilizing resonant switching to reduce the switching losses. Use of high switching frequency planar magnetic transformers with integrated magnetics may be beneficial to reduce overall weight and size of discrete and bulky inductive filter components and may facilitate ease of packaging multiple energy processing blocks into a higher energy/power electric accumulator end-unit.

Figure 4:
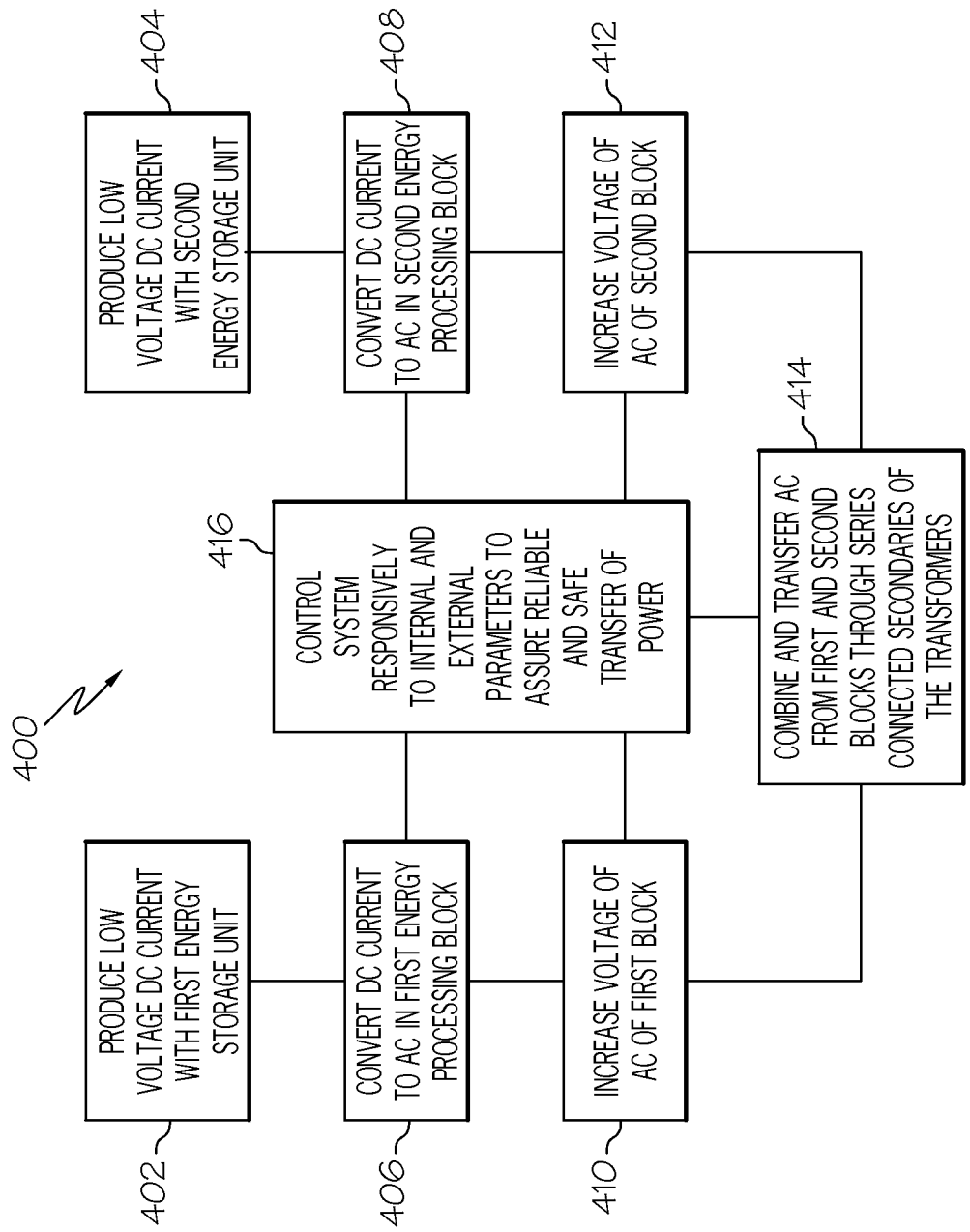
FIG. 4 is a flow chart of a method for managing electrical power in accordance with an embodiment of the invention.

Referring now to FIG. 4, a flow chart 400 may illustrate an exemplary method which may be employed for power management in accordance with an embodiment the invention. In a step 402, unregulated low voltage DC may be produced by a first energy storage unit (e.g., the battery-based unit 26-1 may produce current at a voltage of about 28 volts DC). Similarly, in a step 404, unregulated low voltage DC may be produced by a second energy storage unit (e.g., the battery-based unit 26-2 may produce current at a voltage of about 28 volts DC). In a step 406, the DC from step 402 may be converted to AC (e.g., the converter 32-1 may convert DC to AC). Similarly, in a step 408, the DC from step 404 may be converted to AC (e.g., the converter 32-2 may convert DC to AC). In a step 410, voltage of AC from step 404 may be increased (e.g. the transformer 34-1 may increase the output voltage of the converter 32-1). Similarly, in a step 412, voltage of AC from step 408 may be increased (e.g. the transformer 34-2 may increase voltage of current from the converter 32-2). In a step 414, high voltage AC from steps 410 and 412 may be combined (e.g., as shown in FIG. 2 secondary windings 34-1-1 and 34-2-2 may be connected in series to obtain a higher AC voltage with the same current and then connected to the synchronous rectifier 22) so that energy from the blocks 20-1 and 20-2 may be combined and transferred at a desired higher output voltage). In a step 416, performance of the steps 406, 408, 410, 412 and 414 may be continuously monitored and controlled so that regulated high voltage DC may be provided by the accumulator 12.

It may be noted that in another aspect of the present invention, a high voltage energy accumulator may reuse some power processing blocks and with additional circuitry including tertiary transformer windings and AC-DC converters may provide a regulated low voltage (e.g., 28V or ±28V DC) bus with galvanic isolation and inherent self protection to supply energy to 28V or ±28V DC loads, as required. Similarly, much of the internal circuitry could be advantageously reused to supply energy at 50/60 HZ.

It should be understood, of course, that the foregoing relates to exemplary embodiments of the invention and that modifications may be made without departing from the spirit and scope of the invention as set forth in the following claims.

We claim:

1. A power management system for producing a desired output voltage (Vout), the system comprising;
   a power source;
   a distribution system between the power source and electrical loads;
   an energy accumulator comprising a synchronous rectifier and a plurality (n) of energy processing blocks, the energy processing blocks individually comprising:
   a) an energy storage unit;
   b) a DC-AC converter;
   c) a bidirectional buck-boost converter; and
   d) a primary winding of a transformer;
   a controller having connections with:
   a) all of the energy storage units to receive a measured voltage or current signal from each of the energy storage units,
   b) the synchronous rectifier to receive a measured voltage or current signal from the synchronous rectifier and
   c) the buck-boost converters of each energy processing block to provide control signals to the buck-boost converters to control output voltage and current from each of the energy processing block responsively to the voltage or current signals from the synchronous rectifier and a corresponding one of the energy storage units of said energy processing block, said control signals resulting in one or more of the energy processing blocks producing individual output voltages in excess of Vout/n in the event of another one or more of the energy processing blocks being incapable of producing individual output voltages of at least Vout/n; and
   wherein secondary windings of the transformers are connected with one another in series so that the accumulator can transfer current to and from the distribution system through the transformers.

2. The power management system of claim 1 wherein individual output voltages of the energy storage units are lower than voltage at an output terminal of the accumulator.

3. The power management system of claim 2:
   wherein the energy storage units are Lithium-ion batteries with output voltages of about 28 volts; and
   wherein the voltage at the output terminal of the accumulator is about 270 volts.

4. An accumulator for electrical energy with a desired output voltage (Vout), the accumulator comprising:
   a plurality (n) of energy processing blocks each comprising at least one energy storage unit; and a bidirectional buck-boost converter;
   a synchronous rectifier; and
   a controller having connections with:
   a) all of the energy storage units to receive a measured voltage or current signal from each of the energy storage units,
   b) the synchronous rectifier to receive a measured voltage or current signal from the synchronous rectifier and
   c) the buck-boost converters of each energy processing block to provide control signals to the buck-boost converters to control output voltage and current from each of the energy processing block responsively to the voltage or current signals from the synchronous rectifier and a corresponding one of the energy storage units of said energy processing block, said control signals resulting in one or more of the energy processing blocks to producing individual output voltages in excess of Vout/n in the event of another one or more of the energy processing blocks being incapable of producing individual output voltages of at least Vout/n.

* * * * *